UNITED STATES PATENT OFFICE.

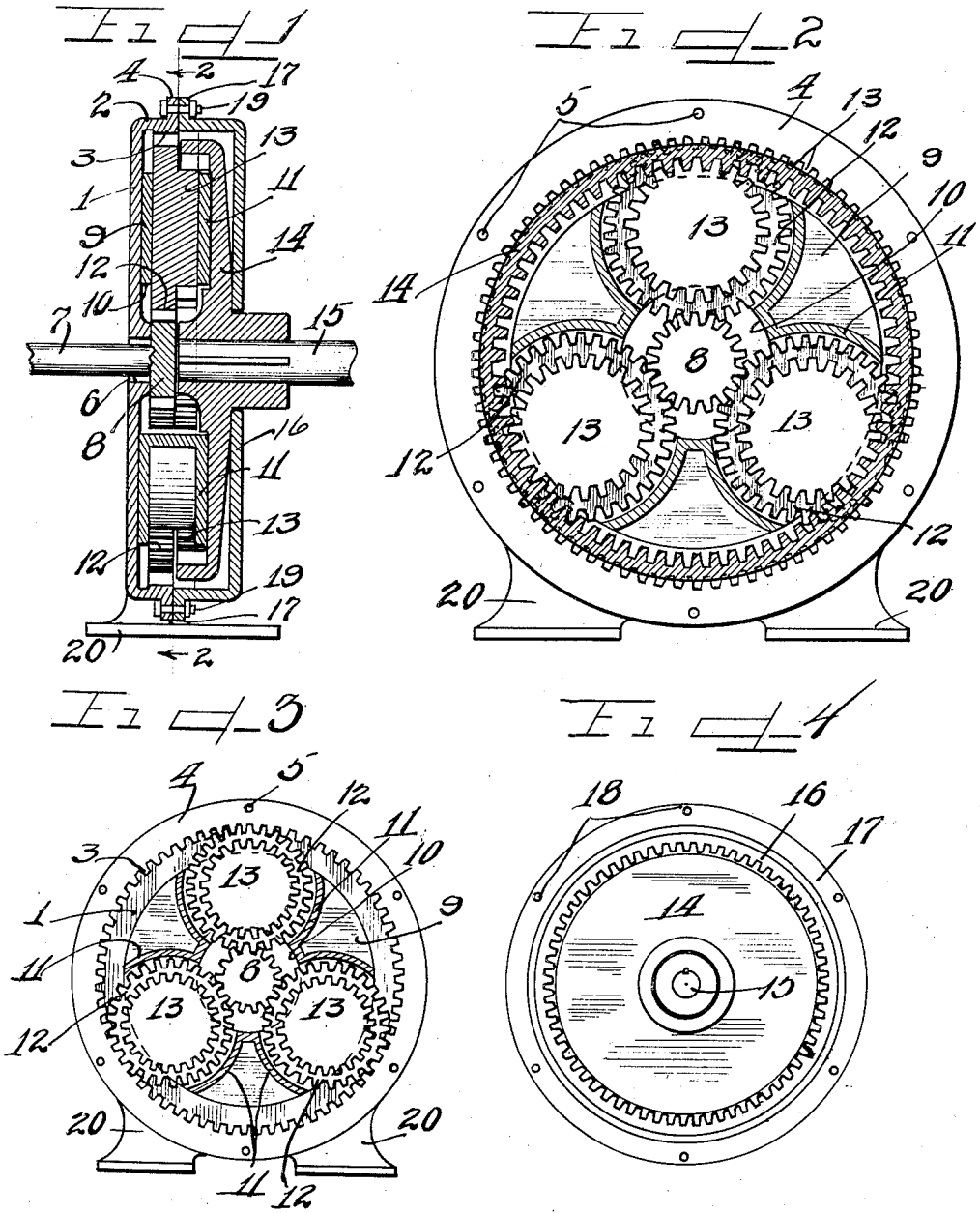

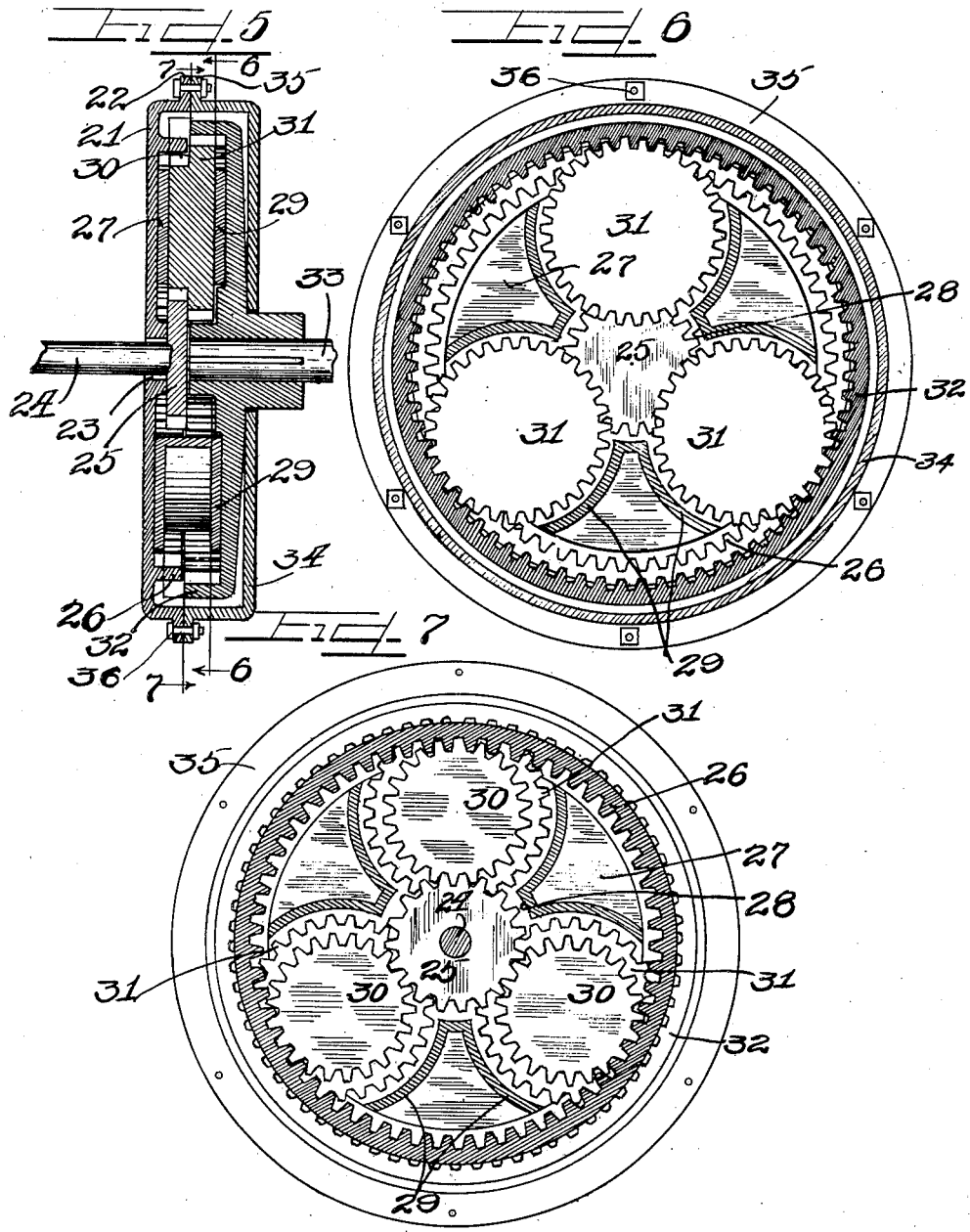

ALBERT E. COOK, OF EVANSTON, AND THOMAS VAN TUYL, OF KANKAKEE, ILLINOIS; SAID VAN TUYL ASSIGNOR TO SAID COOK.

SPEED-CHANGING GEAR.

1,417,797.      Specification of Letters Patent.      Patented May 30, 1922.

Application filed June 14, 1918. Serial No. 240,097.

*To all whom it may concern:*

Be it known that we, ALBERT E. COOK and THOMAS VAN TUYL, citizens of the United States, and residents of the city of Evanston, in the county of Cook, and of the city of Kankakee, in the county of Kankakee, respectively, and State of Illinois, have invented certain new and useful Improvements in Speed-Changing Gears; and we hereby declare that the following is a full, clear, and exact description of the same, reference being had to the accompanying drawings, and to the numerals of reference marked thereon, which form a part of this specification.

This invention relates to an improved form of speed changing gear mechanism adapted to be connected with a driving shaft to change the speed of rotation of a driven shaft connected with said driving shaft through speed change mechanisms.

It is an object of this invention to construct an improved form of a speed reducing mechanism adapted to be readily converted for use as a speed increasing mechanism.

Another object of the invention is the construction of a gear speed changing mechanism adapted to be connected between a driving and driven shaft to change the speed of rotation of the driven shaft to differ from that of the driving shaft, and rotate the driven shaft in the same direction as that of said driving shaft.

It is furthermore an object of this invention to construct a speed change mechanism adapted to be connected between a driving and a driven shaft to change the speed of rotation of the driven shaft to differ from that of the driving shaft and rotate the driven shaft in a direction opposite to that of the driving shaft.

It is also an object of this invention to construct a speed change mechanism permitting a multiple compound equalized use of the teeth of the gear members of the mechanism.

It is a further object of the invention to provide a floating gear mechanism adapted to be operated by a driving shaft to transmit a different speed to a driven shaft.

It is an important object of the invention to construct a simple and improved form of speed changing mechanism for driving a driven shaft in the same direction and at a changed rate of speed from that of the driving shaft or in an opposite direction by means of an internal gear co-acting with floating gears which are driven by the driving shaft.

Other and further important objects of this invention will be apparent from the disclosures in the specification and drawings.

The invention (in a preferred form) is illustrated in the drawings and hereinafter more fully described.

On the drawings:

Figure 1 is a longitudinal vertical section taken through a speed changing mechanism embodying the principles of this invention.

Figure 2 is a section taken on line 2—2 of Figure 1, with parts omitted.

Figure 3 is a reduced view similar to that shown in Figure 2, with the movable internal gear member omitted.

Figure 4 is an inner elevation of the movable internal gear member showing a portion of the casing which encloses the same.

Figure 5 is a central vertical section taken through a modified form of the device, with parts in elevation.

Figure 6 is a section taken on line 6—6 of Figure 5, with parts omitted.

Figure 7 is a section taken on line 7—7 of Figure 5.

As shown on the drawings:

The reference numeral 1, indicates a circular outer plate of one half of a stationary casing. Said plate has integrally formed at right angles to the periphery thereof a flange ring 2, on the inner peripheral surface of which is an integral stationary internal gear 3. Formed integral with and at right angles to the inner edge of the ring portion 2, is an outwardly directed attaching flange 4, provided with a plurality of apertures 5. Projecting through an axial opening 6, formed in the plate 1, is the free end of a highspeed driving shaft 7, having keyed or otherwise secured on the inner end thereof within the casing a small driving gear 8, disposed in the plane of the stationary internal gear 3.

Disposed within the casing is a floating spider 9, having a large central opening 10, therein within which the driving gear 8, is disposed. The spider 9, is provided with a plurality of pockets or housings 11, within each of which is a unitary floating double gear member, comprising a large gear 12, in mesh with the driving gear 8, and the stationary internal gear 3. Integrally formed on one side of each of the large floating gears 12, and co-axial therewith is a small floating gear 13. The housings 11, are provided with suitable openings to permit the large floating gears 12, to mesh with the driving gear 8, and the internal gear 3, and also permitting the small floating gears 13, to mesh with a rotatable internal gear 14, keyed or otherwise rigidly secured on the inner end of a driven shaft 15. The diameter of the rotatable internal gear 14, is less than that of the stationary internal gear 3. The other half of the casing is denoted by the reference numeral 16, and has an intergral flange 17, provided with apertures 18, adapted to register with the apertures 5, to permit retaining bolts 19, to engage through the apertures 5 and 18, for rigidly holding both halves of the casing together to enclose the gear mechanisms. As shown, the stationary casing is provided with supports or legs 20.

Figures 5, 6 and 7, disclose a modified form of the device comprising one half of a stationary casing denoted by the reference numeral 21, and provided with an apertured attaching flange 22. Projecting through an axial opening 23, formed in the half casing 21, is the free end of a driving shaft 24, having keyed or otherwise secured on the inner end thereof within the half casing 21, a small driving gear 25, disposed in the plane of a stationary internal gear 26, integrally formed on the inner surface of the casing member 21.

Disposed within the casing member 21, is a floating spider 27, having a large central opening 28, therein within which the driving gear 25, is disposed. The spider 27, is provided with a plurality of pockets or housings 29, within each of which is a unitary floating double gear member, comprising a small gear 30, in mesh with the driving gear 25, and the stationary internal gear 26. Integrally formed on one side of each of the small floating gears 30, and axially aligned therewith is a large floating gear 31. The housings 29, are provided with suitable openings to permit the small floating gears 30, to mesh with the driving gear 25, and the internal gear 26, and also permitting the large floating gears 31, to mesh with a rotatable internal gear 32, keyed or otherwise rigidly secured on the inner end of a driven shaft 33. The diameter of the rotatable internal gear 32, is greater than that of the stationary internal gear 26. The other half of the casing is denoted by the reference numeral 34, and has an integral attaching flange 35, provided with a plurality of apertures adapted to register with the apertures in the flange 22, to permit retaining bolts 36, to engage through said registering apertures for rigidly holding both halves of the casing together to enclose the gear mechanisms.

The operation is as follows:

With the parts assembled as described, and as shown in Figure 1, the compound floating gears 12—13, are held in operating position by means of the side walls of the floating spider 9, which in turn is held in position by the rotatable internal gear 14, the diameter of which is less than that of the stationary internal gear 3.

When the floating driving shaft 7, is rotated, the driving gear 8, rotates therewith at the same rate of speed, and due to its meshing engagement with the three double or compound floating gears 12—13, which are centralized within the stationary internal gear 3, and are spaced equidistantly apart to receive an equalized drive from the driving gear 8, and hold the same in a balanced centralized position therebetween. The double floating gears are rotated by the gear 8, in an opposite direction at a reduced rate of speed. Said large floating gears 12, being in mesh with the stationary internal gear 3, and the driving gear 8, at all times, are accordingly caused to simultaneously rotate and revolve within the casing, carrying the spider 9, therewith. The small floating gears 13, are provided with less teeth than the gears 12, and being in mesh with the floating rotatable internal gear 14, rotates the same and consequently the floating driven shaft 15, in the same direction as the direction of rotation of the driving shaft 7, and at a rate of speed materially less than that of said driving shaft. The amount of reduction in speed between the driving and the driven shaft, is proportionate to the diameter of the various gears together with the compensating effect produced by the number of teeth thereon, so that approximately any desired speed may be obtained for the driven shaft 15, by a proper arrangement of gears.

The direction of rotation of the driven shaft 15, is the same as that of the driving shaft 7, for the reason that the movement of the large floating gears 12, around the stationary internal gear 3, is faster than the movement of the small floating gears 13, around the movable internal gear 14, the diameter of which is less than that of the stationary internal gear 3.

The operation of the modified form of speed changing device shown in Figures 5, 6 and 7, is substantially the same as that already described. In this case, however, the small floating gears 30, are in mesh with the driving gear 25, and with the stationary internal gear 26, the diameter of which is less than that of the movable internal gear 32, with which the large floating gears 31, mesh. This arrangement of gears causes the driven shaft 33, to rotate in a direction opposite to that of the driving shaft 24, and at a rate of speed less than that of said driving shaft.

From the description already given, it will be seen that in both forms of the device as clearly shown in Figures 1 and 5, that the direction of rotation of the driven shaft with respect to the driving shaft depends upon the relative diameter of the stationary internal gear and the rotatable internal gear. Where the stationary internal gear has a diameter greater than that of the rotatable internal gear, the direction of rotation of the driving and driven shafts is the same, and when the diameter of the stationary internal gear is less than that of the rotatable internal gear, the shafts rotate in opposite directions.

It will be understood that in both forms of the device, as described and disclosed, that the driven shafts may be used as the driving shafts and the driving shafts as the driven shafts, whereby the speed of a drive imparted to the device is increased instead of being reduced.

Another important feature of the invention is clearly disclosed in Figures 1 and 5, which show that the driving gear may be in operating engagement with either the smaller or larger gears comprising the compound floating gear members to effect a speed change without effecting the direction of rotation of the driving and driven shafts.

The novel arrangement of the gear members of the device permits a multiple compound equalized use of the teeth of said gear members to permit the use of gear members of reduced size without effecting a reduction in the amount of load adapted to be carried or transmitted by said teeth.

We are aware that various details of construction may be varied and numerous changes may be made without departing from the principles of our invention, and we therefore do not purpose limiting the patent granted otherwise than necessitated by the prior art.

We claim as our invention:—

1. In a device of the class described, a casing, a stationary internal gear integral therewith, a floating spider within said casing, floating gears within said spider meshing with said stationary internal gear, a movable internal gear meshing with said floating gears, a driven shaft secured to said movable internal gear, and a geared driving shaft connected with said floating gears to rotate the same whereby said driven shaft is rotated at a rate of speed different from that of the driving shaft.

2. A speed changing mechanism comprising floating shafts, gear means on the inner end of each thereof, a floating speed changing means engaged between said gear means adapted to reduce the speed of a drive when one of said shafts is used as the driving shaft, and increase the speed of a drive when the other of said shafts is used as the driving shaft.

3. In a device of the class described, a floating driving member, a stationary internal gear, three compound floating gears spaced equidistantly from one another in mesh with said stationary internal gear and with said driving member to hold said driving member in a balanced centralized position therebetween, and a floating driven member in mesh with said floating compound gears and held in a balanced centralized position thereby, and rotated at a changed rate of speed from that of said driving member.

4. A speed change mechanism comprising a pair of shafts, gear means on the inner adjacent ends of each thereof, compound floating gears between said gear means, a floating spider for holding said compound floating gears spaced in proper relation, one of said shafts adapted to receive a drive and transmit the same to said compound floating gears which change the speed of said drive and transmit the changed drive to the other of said shafts and rotates the same in the same direction as that of said first mentioned shaft.

5. A speed change mechanism embracing a pair of aligned shafts, a stationary gear, load compensating balanced floating gears engaged therewith and disposed between said shafts a floating spider having pockets therein for receiving and separating said gears, either of said shafts adapted to receive a drive and transmit the same through said balanced floating gears to the other shaft at a changed rate of speed to rotate said shaft in the same direction as that of said drive receiving shaft.

6. A speed change mechanism comprising a floating driving means, three point contacting means engaged therewith for yieldably holding the same in a floating driving position, and driven means yieldably held in position by said three point contacting means to be driven at a rate of speed different from that imparted by said driving means.

7. A speed reducing mechanism comprising a floating driving means, a driving means, a plurality of compound floating gears connecting said driving means, and a floating pocketed spider for holding said compound floating gears in proper spaced operating relation.

8. A speed reducing mechanism comprising a stationary casing, a floating drive shaft projecting therein, a driving gear rigidly secured on the inner end thereof, a driven shaft projecting into said casing, an internal gear secured on the inner end thereof, an internal gear formed in said casing, a spider in said casing having pockets therein, and two integrally connected gears in each of said spider pockets meshing with said internal gears and with said driving gear.

In testimony whereof we have hereunto subscribed our names in the presence of two subscribing witnesses.

ALBERT E. COOK.
THOMAS VAN TUYL.

Witnesses:
 FRANK A. BREMER, Jr.,
 FRED E. PAESLER.